US012795772B2

(12) United States Patent
Kim

(10) Patent No.: US 12,795,772 B2
(45) Date of Patent: Nov. 10, 2026

(54) METHOD AND APPARATUS FOR MANAGING UPLINK TRANSMISSION RESOURCE DURING SYNCHRONOUS RECONFIGURATION IN MOBILE WIRELESS COMMUNICATION SYSTEM

(71) Applicant: SIGNALIS CO., LTD., Daejeon (KR)

(72) Inventor: Soenghun Kim, Hanam-si (KR)

(73) Assignee: SIGNALIS CO., LTD., Daejeon (KR)

( * ) Notice: Subject to any disclaimer, the term of this patent is extended or adjusted under 35 U.S.C. 154(b) by 259 days.

(21) Appl. No.: 18/792,724

(22) Filed: Aug. 2, 2024

(65) Prior Publication Data

US 2025/0113403 A1 Apr. 3, 2025

(30) Foreign Application Priority Data

Aug. 3, 2023 (KR) ........................ 10-2023-0101720

(51) Int. Cl.

*H04W 4/00* (2018.01)
*H04L 5/00* (2006.01)
*H04W 56/00* (2009.01)
*H04W 76/27* (2018.01)

(52) U.S. Cl.

CPC ........... *H04W 76/27* (2018.02); *H04L 5/0048* (2013.01); *H04L 5/0053* (2013.01); *H04W 56/0045* (2013.01)

(58) Field of Classification Search

CPC .. H04W 76/27; H04W 56/0045; H04L 5/0053
See application file for complete search history.

(56) References Cited

U.S. PATENT DOCUMENTS

2013/0242953 A1* 9/2013 Malkamaki ....... H04W 56/0045 370/336
2016/0365959 A1* 12/2016 Dinan ................... H04L 5/0053
2023/0102937 A1* 3/2023 Kim .................. H04W 72/1268 370/329
2024/0276320 A1* 8/2024 Eklöf ................ H04W 36/0069
2024/0357660 A1* 10/2024 Nam ...................... H04L 67/125
2025/0063632 A1* 2/2025 Yuan ......................... H04L 1/06

OTHER PUBLICATIONS

CMCC, "Report of [Post122][114][NR NTN Enh] Unchanged PCI (CMCC)", 3GPP TSG-RAN WG2 Meeting #123, Toulouse, France, R2-230xxxx, Aug. 21-25, 2023.
ETSI MCC, "Report of 3GPP TSG RAN WG2 meeting #121bis-e, Online", 3GPP TSG-RAN WG2 meeting #122, Online, R2-230xxxx, Apr. 17-26, 2023.

(Continued)

*Primary Examiner* — Shantell L Heiber
(74) *Attorney, Agent, or Firm* — PnK IP LLC

(57) ABSTRACT

A method of a wireless user device includes receiving a first RRCReconfiguration message in a first cell, performing uplink transmission in the first cell based on CSI-Report-Config and SchedulingRequestConfig and SRS-Config while TAT is running, initiating synchronous reconfiguration towards a second cell, stopping TAT, performing first set of actions for the first type synchronous reconfiguration and second set of actions for the second type of synchronous reconfiguration, and performing uplink transmission in the second cell after synchronous reconfiguration.

1 Claim, 10 Drawing Sheets

(56) References Cited

OTHER PUBLICATIONS

ETSI MCC, "Report of 3GPP TSG RAN WG2 meeting #122, Incheon, Korea", 3GPP TSG-RAN WG2 meeting #123, R2-230xxxx, May 22-26, 2023.
MediaTek Inc., "Handover Enhancement in Earth-moving Cells", 3GPP TSG-RAN WG2 Meeting #122bis, Incheon, Korea, Tdoc R2-2304734, May 22-26, 2023.
Vivo, "Further discussion on service link switching with unchanged PCI," 3GPP TSG-RAN WG2 Meeting #122, Incheon, Korea, R2-2304836, May 22-26, 2023.
CATT, "Discussion on unchanged PCI scenario", 3GPP TSG-RAN WG2 Meeting #122, Incheon, Korea, R2-2304899, May 22-26, 2023.
Qualcomm Incorporated, "Satellite switch enhancements for NTN", 3GPP TSG-RAN WG2 Meeting #122, Incheon, Korea, R2-2305197, May 22-26, 2023.
InterDigital, "Satellite switching without PCI change", 3GPP RAN WG2 Meeting #122, Incheon, Republic of Korea, R2-2305937, May 22-25, 2023.
Intel Corporation, "Correction of Rel-18 NR NTN enhancements", 3GPP TSG-WG Meeting #115, R1-232735, Chicago, USA, Nov. 13-17, 2023.
Nokia, "Correction of specification support for NR NTN enhancements", 3GPP TSG-RAN WG1 Meeting #115, R1-2312756 Tdoc#, Chicago, USA, Nov. 13-Nov. 17, 2023.
Samsung, "Maintenance of support for NR NTN enhancements", 3GPP TSG RAN WG1 #115, R1-2312784, Chicago, USA, Nov. 13-17, 2023.
Huawei, "Corrections on Rel-18 NR NTN enhancements in 38.212", 3GPP TSG-RAN WG1 Meeting #115, R1-2312744, Chicago, USA, Nov. 13-17, 2023.
Huawei et al., "CR for NR NTN", 3GPP TSG-RAN WG3 Meeting #122, R3-238158, Chicago, USA, Nov. 13-17, 2023.
Nokia et al., "CR for NR NTN", 3GPP TSG-RAN WG3 Meeting #122, R3-238159, Chicago, USA, Nov. 13-17, 2023.
Thales (Rapporteur), "Introduction of NTN enhancements", 3GPP TSG-RAN WG2 Meeting #124, R2- 2313771, Chicago, United States, Nov. 13, 2023-Nov. 17, 2023.
Ericsson, "Introduction of Rel-18 NR NTN enhancements", 3GPP TSG RAN WG2 #124, R2-2313772, Chicago, USA, Nov. 13-17, 2023 Revision of R2-2313531.
InterDigital, "Introduction of Rel-18 NTN enhancements to TS 38.321", 3GPP RAN WG2 Meeting #124, R2-2313773, Chicago, United States, Nov. 13-17, 2023.
CATT, "Introduction of network verification of UE location in TS 37.355", 3GPP TSG-RAN WG2 Meeting #124, R2-2313777, Chicago, USA, Nov. 13-17, 2023.
Qualcomm Inc., "Introduction of network verification of UE location", 3GPP TSG-RAN WG2 Meeting #124, R2-2313778, Chicago, USA: Nov. 13-17, 2023.
InterDigital et al., "Introduction of RACH-less handover for NR NTN and mobile IAB to TS 38.321", 3GPP RAN WG2 Meeting #124, R2-2313962, Chicago, United States, Nov. 13-17, 2023.
Samsung, "LCID extension for CCCH/CCCH1 [LCID-extension]", 3GPP TSG-RAN WG2 Meeting #124, R2-2313965, Chicago, IL, USA, Nov. 13-17, 2023.
ZTE Corporation et al., "Introduction of NR NTN enhancements in 38.304", 3GPP TSG-RAN WG2 Meeting #124, R2-2314071, Chicago, USA, Nov. 13-17, 2023.
ETSI MCC, "Report of 3GPP TSG RAN WG2 meeting #121bis-e, Online", 3GPP TSG-RAN WG2 meeting #122, R2-2306553, Apr. 17-26, 2023.
ETSI MCC, "Report of 3GPP TSG RAN WG2 meeting #122, Incheon, Korea", 3GPP TSG-RAN WG2 meeting #123, R2-2307001, May 22-26, 2023.
3GPP TS 38.300 V17.5.0 (Jun. 2023); 3rd Generation Partnership Project; Technical Specification Group Radio Access Network; NR; NR and NG-RAN Overall Description; Stage 2 (Release 17).
3GPP TS 38.331 V17.5.0 (Jun. 2023); 3rd Generation Partnership Project; Technical Specification Group Radio Access Network; NR; Radio Resource Control (RRC) protocol specification (Release 17).
3GPP TS 38.321 V17.5.0 (Jun. 2023); 3rd Generation Partnership Project; Technical Specification Group Radio Access Network; NR; Medium Access Control (MAC) protocol specification (Release 17).
3GPP TS 38.213 V17.6.0 (Jun. 2023); 3rd Generation Partnership Project; Technical Specification Group Radio Access Network; NR; Physical layer procedures for control (Release 17).

* cited by examiner

METHOD AND APPARATUS FOR MANAGING UPLINK TRANSMISSION RESOURCE DURING SYNCHRONOUS RECONFIGURATION IN MOBILE WIRELESS COMMUNICATION SYSTEM

CROSS-REFERENCE TO RELATED APPLICATION

This application claims priority to and the benefit of Korean Patent Application No. 10-2023-0101720, filed on Aug. 3, 2023. The contents of the above applications are incorporated herein by reference in their entireties.

BACKGROUND

To meet the increasing demand for wireless data traffic since the commercialization of 4th generation (4G) communication systems, the 5th generation (5G) system is being developed. For the sake of high data rate, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, a base station may be divided into a central unit and a plurality of distributed units for better scalability. In addition, in the 5G communication system, a non-terrestrial network is introduced with the goal of providing seamless coverage for the area where terrestrial network does not cover.

SUMMARY

Example aspects of the present disclosure are to address the problems of performing synchronous reconfiguration in mobile network. The method of the terminal includes receiving a first RRCReconfiguration message in a first cell, performing uplink transmission in the first cell based on CSI-ReportConfig and SchedulingRequestConfig and SRS-Config while TAT is running, initiating synchronous reconfiguration towards second cell, stopping TAT, performing first set of actions for the first type synchronous reconfiguration and second set of actions for the second type of synchronous reconfiguration, and performing uplink transmission in the second cell after synchronous reconfiguration.

DETAILED DESCRIPTION

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

In the present disclosure, “trigger” or “triggered” and “initiate” or “initiated” can be used interchangeably.

In the present disclosure, UE and terminal can be used interchangeably. In the present disclosure, NG-RAN node and base station and GNB can be used interchangeably. A base station may include one or more NG-RANs, GNBs, E-UTRAN, eNBs, and/or any other base stations that implement additional features of any other wireless communication protocols (e.g., Wi-Fi, 2G, 3G, 4G, 5G, 6G, etc.)

Figure 1A:
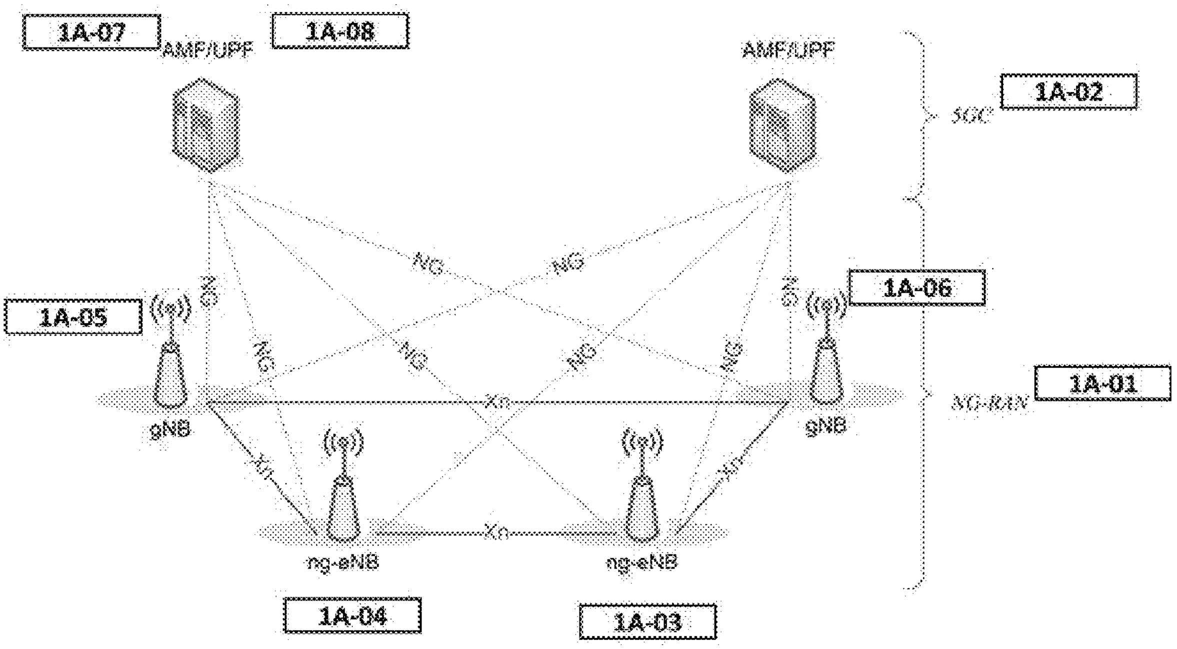
FIG. 1A is a diagram illustrating the architecture of an 5G system and a NG-RAN to which the disclosure may be applied.

FIG. 1A is a diagram illustrating an example architecture of an 5G system and a NG-RAN to which the disclosure may be applied.

5G system may include NG-RAN 1A-01 and 5GC 1A-02. An NG-RAN node may be either:

- a gNB, providing NR user plane and control plane protocol terminations towards the UE; or
- an ng-eNB, providing E-UTRA user plane and control plane protocol terminations towards the UE.

The gNBs 1A-05 or 1A-06 and ng-eNBs 1A-03 or 1A-04 are interconnected with each other by means of an Xn interface (e.g., the Xn interface according to one or more 3GPP standards specification). The gNBs and ng-eNBs are also connected by means of an NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below:

- Functions for Radio Resource Management such as Radio Bearer Control, Radio Admission Control, Connection Mobility Control, Dynamic allocation of resources to UEs in uplink, downlink and sidelink (scheduling); and
- IP and Ethernet header compression, uplink data decompression and encryption of user data stream; and

- Selection of an AMF at UE attachment when no routing to an MME can be determined from the information provided by the UE; and
- Routing of User Plane data towards UPF; and
- Scheduling and transmission of paging messages; and
- Scheduling and transmission of broadcast information (originated from the AMF or O&M); and
- Measurement and measurement reporting configuration for mobility and scheduling; and
- Session Management; and
- QoS Flow management and mapping to data radio bearers; and
- Support of UEs in RRC_INACTIVE state; and
- Radio access network sharing; and
- Tight interworking between NR and E-UTRA; and
- Support of Network Slicing.

The AMF 1A-07 may host the functions such as NAS signaling, NAS signaling security, AS security control, SMF selection, Authentication, Mobility management and positioning management.

The UPF 1A-08 may host the functions such as packet routing and forwarding, transport level packet marking in the uplink, QoS handling and the downlink, mobility anchoring for mobility etc.

Figure 1B:
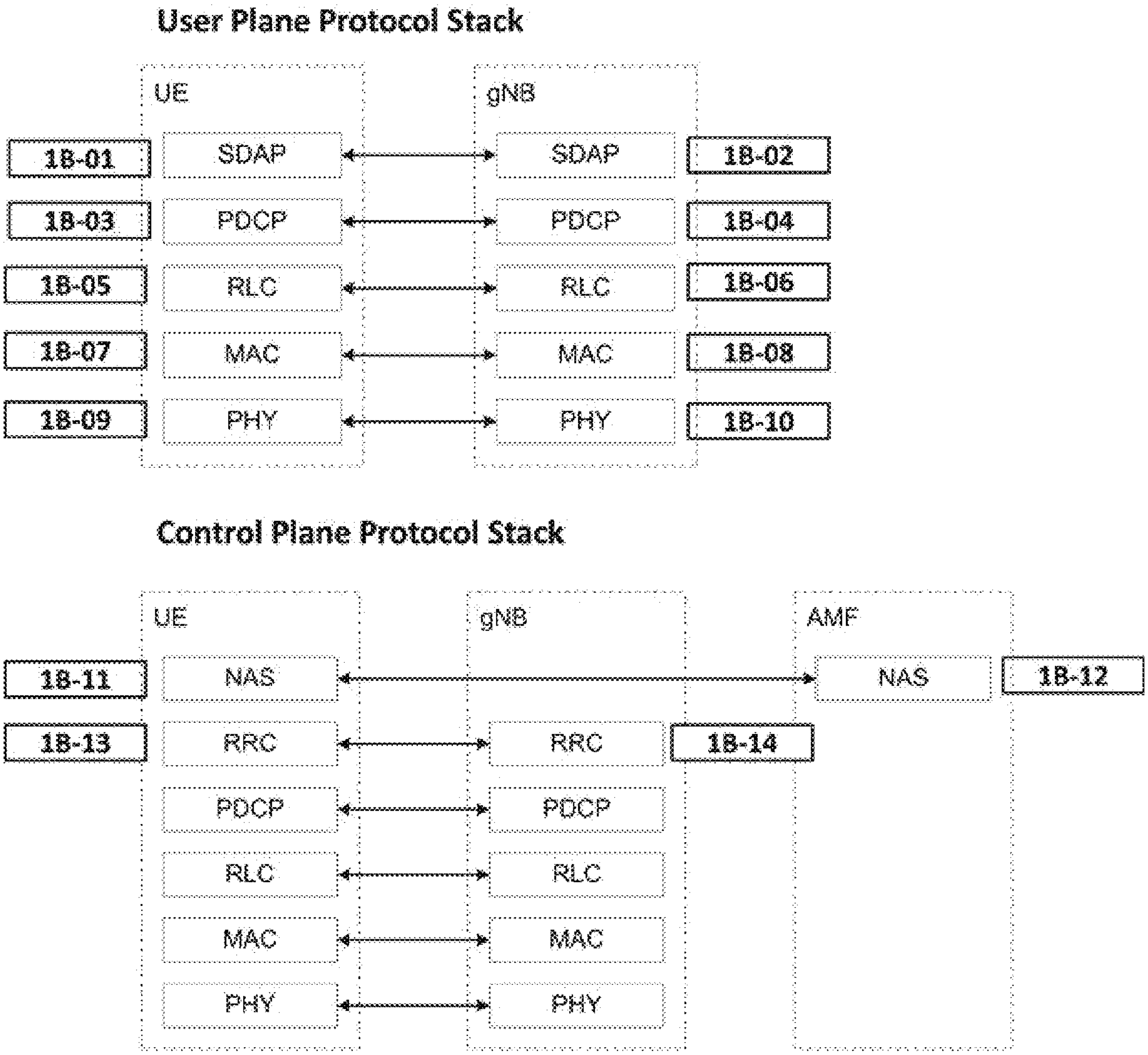
FIG. 1B is a diagram illustrating a wireless protocol architecture in an 5G system to which the disclosure may be applied.

FIG. 1B is a diagram illustrating a wireless protocol architecture in an 5G system to which the disclosure may be applied.

User plane protocol stack may include SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed below:

- NAS: authentication, mobility management, security control etc
- RRC: System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.
- SDAP: Mapping between a QoS flow and a data radio bearer, Marking QoS flow ID (QFI) in both DL and UL packets.
- PDCP: Transfer of data, Header compression and decompression, Ciphering and deciphering, Integrity protection and integrity verification, Duplication, Reordering and in-order delivery, Out-of-order delivery etc.
- RLC: Transfer of upper layer PDUs, Error Correction through ARQ, Segmentation and re-segmentation of RLC SDUs, Reassembly of SDU, RLC re-establishment etc.
- MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.
- PHY: Channel coding, Physical-layer hybrid-ARQ processing, Rate matching, Scrambling, Modulation, Layer mapping, Downlink Control Information, Uplink Control Information etc.

The terminal supports three RRC states.

RRC_IDLE state can be characterized with followings:

- PLMN selection; Broadcast of system information;
- Cell re-selection mobility;
- Paging for mobile terminated data is initiated by 5GC;
- DRX for CN paging configured by NAS.

RRC_INACTIVE state can be characterized with followings:

- PLMN selection; Broadcast of system information;
- Cell re-selection mobility;
- Paging is initiated by NG-RAN (RAN paging);
- RAN-based notification area (RNA) is managed by NG-RAN;
- DRX for RAN paging configured by NG-RAN;
- 5GC-NG-RAN connection (both C/U-planes) is established for UE;
- The UE AS context is stored in NG-RAN and the UE;
- NG-RAN knows the RNA which the UE belongs to.

RRC_CONNECTED state can be characterized with followings:

- 5GC-NG-RAN connection (both C/U-planes) is established for UE;
- The UE AS context is stored in NG-RAN and the UE;
- NG-RAN knows the cell which the UE belongs to;
- Transfer of unicast data to/from the UE; and
- Network controlled mobility including measurements.

Figure 1C:
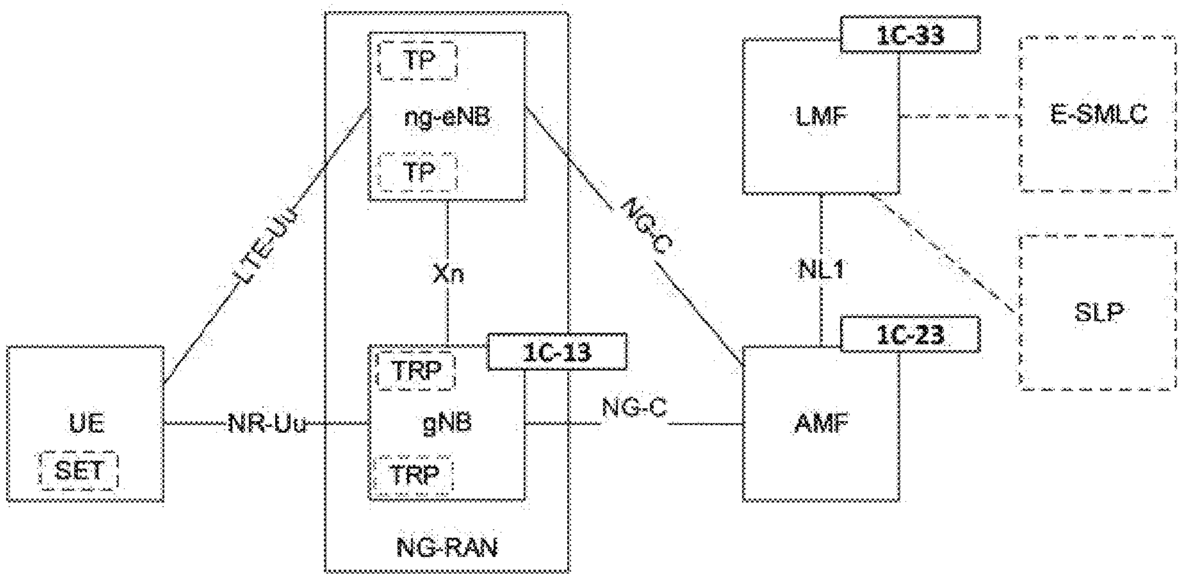
FIG. 1C is a diagram illustrating RRC state transition.

FIG. 1C is a diagram illustrating an RRC state transition.

Between RRC_CONNECTED 1C-11 and RRC_INACTIVE 1C-13, a state transition occurs due to an exchange of a Resume message (e.g., one or more Resume messages according to one or more 3GPP standards specification) and a Release message (e.g., one or more Release messages, such as RRC Release messages according to one or more 3GPP standards specification) containing the Suspend IE (e.g., one or more Suspend IEs according to one or more 3GPP standards specification).

A state transition occurs between RRC_CONNECTED 1C-11 and RRC_IDLE 1C-15 through RRC connection establishment and RRC connection release.

Figure 1D:
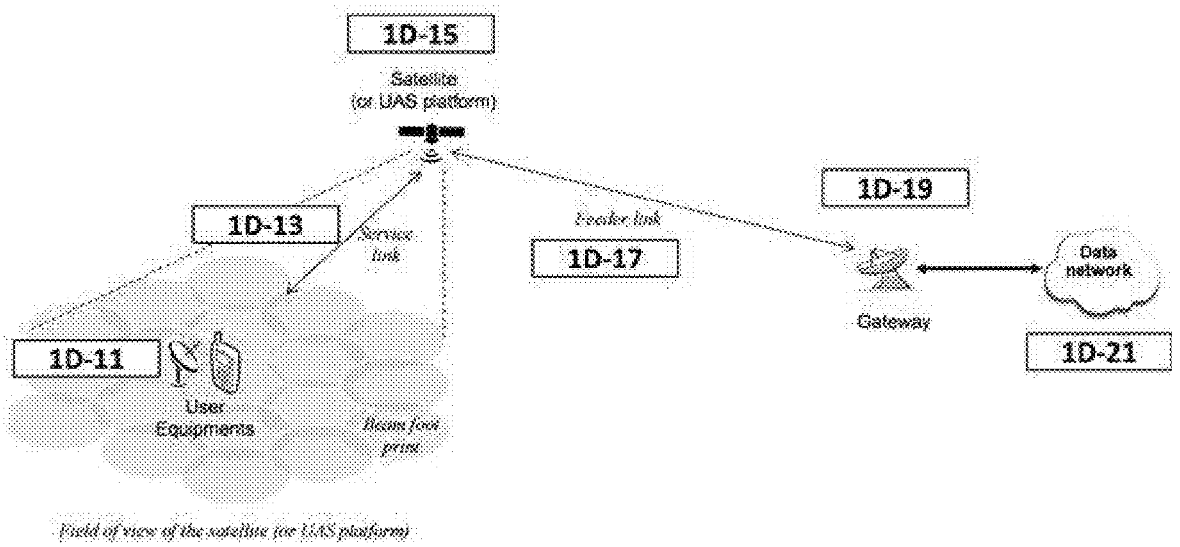
FIG. 1D is a diagram illustrating architecture of NTN

FIG. 1D is a diagram illustrating architecture of NTN.

A non-terrestrial network refers to a network, or segment of networks using RF resources on board a satellite (or UAS platform).

The typical scenario of a non-terrestrial network providing access to user equipment is depicted in FIG. 1D.

Non-Terrestrial Network typically consists of the following elements:

One or several sat-gateways 1D-19 that connect the Non-Terrestrial Network to a public data network 1D-21. A Feeder link 1D-17 or radio link between a sat-gateway and the satellite. A service link 1D-13 or radio link between the user equipment and the satellite. A satellite 1D-15 providing RF resource. User Equipment 1D-11 served by the satellite within the targeted service area.

Figure 1E:
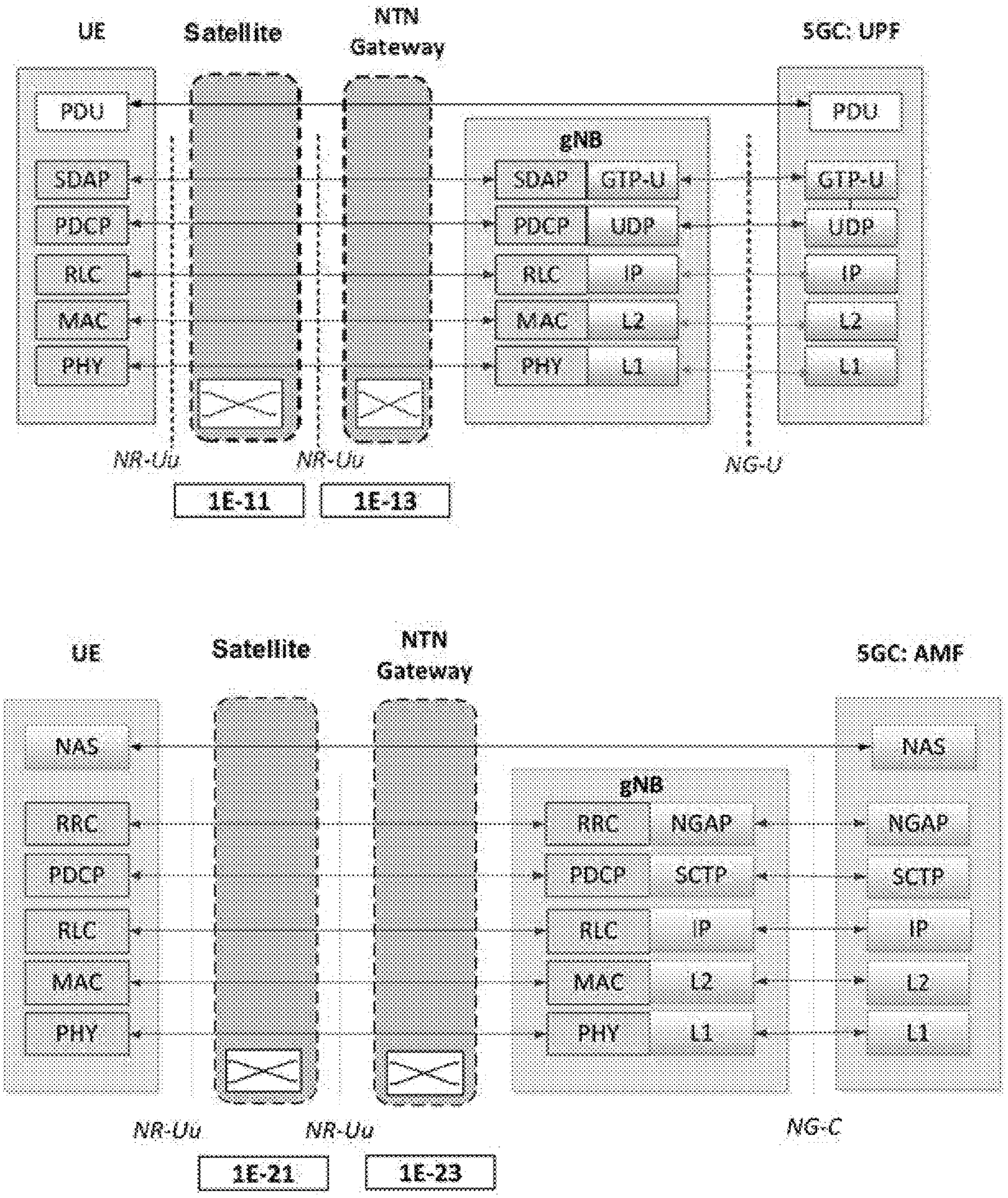
FIG. 1E is a diagram illustrating protocol architecture of NTN.

FIG. 1E is a diagram illustrating protocol architecture of NTN.

Satellite 1E-11 or 1E-21 and NTN gateway 1E-13 and 1E-23 are equipped with RF processing & Frequency Switching to relay the signal between a base station (e.g., eNB, gNB, etc.; hereinafter the base station may be referred to as gNB) and UE. Other protocols such as SDAP, PDCP, RLC, MAC, PHY, RRC, NAS are same as used in normal terrestrial network.

FIG. 1E is a diagram illustrating protocol architecture of NTN.

Satellite 1E-11 or 1E-21 and NTN gateway 1E-13 and 1E-23 are equipped with RF processing & Frequency Switching to relay the signal between gNB and UE. Other protocols such as SDAP, PDCP, RLC, MAC, PHY, RRC, NAS are same as used in normal terrestrial network.

An RRC reconfiguration is a procedure to change various configuration of a UE. The RRC reconfiguration could be performed either in an asynchronous manner or in a synchronous manner.

In an asynchronous reconfiguration, the new configuration information is provided by a RRC reconfiguration message (e.g., RRCReconfiguration). UE applies the new configuration when the contents of the RRCReconfiguration is successfully decoded. The base station applies the new configuration when the RRCReconfiguration is considered successfully transmitted. Since UE and base station apply the new configuration at different point of time, it is considered as asynchronous reconfiguration.

In synchronous reconfiguration, a random access procedure between UE and the base station is performed before the new configuration is applied. Upon successful completion of the random access procedure, UE and base station apply the new configuration almost simultaneously.

Synchronous reconfiguration is applied for various procedure including handover. Since some handover procedures involve PCI change and layer 2 reset and security key change, the reconfiguration needs to be synchronous between the UE and the base station.

In NTN, a serving cell of many UEs can change even when those UEs do not move. For example, a hard switch on service link (e.g., serving satellite covering a geographical area changes) may cause change of the serving satellite. However, the cell coverage of the satellites could be identical before and after the service link change.

In this scenario, network may use the same cell identifier (e.g., a physical cell identifier (PCI)) for the cell served by the old satellite and for the cell served by the new satellite to avoid layer 2 reset and to reduce service interruption.

If the cell identifier (e.g., PCI) of the cell remain the same, and the main configuration (e.g. CSI report configuration, layer 2 bearer configuration, MAC configuration, etc.) remain the same before and after the hard switch, the UE and the base station can apply a more efficient reconfiguration procedure.

In a network point of view, even if the old satellite (and the old cell) and the new satellite (and the new cell) provide the same coverage for same UEs, admission control may not allow some UEs to use the same configuration in the new cell. In this case, the base station may first determine which UE is subject to the new reconfiguration procedure and which UE is subject to the legacy reconfiguration procedure. Then the base station (e.g., a GNB) can instruct the UEs to perform appropriate reconfiguration procedure according to the determination.

In this disclosure, two types of synchronous reconfiguration are described: Message Based Synchronous Reconfiguration (MBSR) and Time Based Synchronous Reconfiguration (TBSR).

MBSR is a synchronous reconfiguration procedure that may be triggered by a RRCReconfiguration containing ReconfigurationWithSync. MBSR may be for a handover (e.g., a handover using one or more procedures according to the 3GPP standards) and a conditional handover where main configuration changes upon reconfiguration.

TBSR is a synchronous reconfiguration procedure that may be triggered at a specific time point based on system information. TBSR is for simplified handover where the main configuration remains the same.

In the present disclosure, a synchronous reconfiguration procedure of a first type may be the MBSR and a synchronous reconfiguration procedure of a second type may be the TBSR (or alternatively, a synchronous reconfiguration procedure of a first type may be the TBSR and a synchronous reconfiguration procedure of a second type may be the MBSR).

In this disclosure, RRCReconfiguration not containing ReconfigurationWithSync may be referred to as a first type RRCReconfiguration; RRCReconfiguratio containing Reconfiguration WithSync may be referred to as a second type RRCReconfiguration.

In the following description, information elements, fields, messages and procedures etc. related to the disclosure are briefly explained.

RRCReconfiguration message is the command to modify an RRC connection. It may convey information for measurement configuration, mobility control, radio resource configuration (including RBs, MAC main configuration and physical channel configuration) and AS security configuration. RRCReconfiguration containing ReconfigurationWithsync is the command to perform handover.

RRCReconfiguration may include the following fields:

>1: radioBearerConfig (parameters for PDCP and SDAP for one or more radio bearers);

>1: dedicatedSIB1-Delivery; This field is used to transfer SIB1 to the UE; UE applies this field after synchronous reconfiguration is completed.

>1: otherConfig

>1: spCellConfig (e.g. parameters for the target SpCell)

>>2: reconfigurationWithSync;

>>>3: spCellConfigCommon (e.g. ServingCellConfigCommon for target SpCell);

>>>3: newUE-Identity (C-RNTI to be used in the target SpCell);

>>>3: t304 timer (e.g., supervision timer for synchronous reconfiguration);

>>>3: rach-ConfigDedicated (e.g., dedicate random access parameters to be used for the reconfiguration with sync);

>>2: spCellConfigDedicated (e.g. ServingCellConfig for target SpCell);

The IE ServingCellConfigCommon is used to configure cell specific parameters of a UE's serving cell. The IE contains parameters which a UE would typically acquire from SSB, MIB or SIBs when accessing the cell from IDLE.

This IE contains following fields/IEs:

>1: physCellId field includes information corresponding to an integer. This field identifies the physical cell identity (PCI) of the serving cell;

>1: downlinkConfigCommon field includes common downlink configuration of the serving cell, including the frequency information configuration and the initial downlink BWP common configuration;

>1: uplinkConfigCommon field contains common uplink configuration of the serving cell, including the frequency information configuration and the initial uplink BWP common configuration;

>1: n-TimingAdvanceOffset field indicates the N_TA-Offset to be applied for all uplink transmissions on this serving cell;

The IE ServingCellConfigCommonSIB is used to configure cell specific parameters of a UE's serving cell in SIB1. The ServingCellConfigCommonSIB contains downlinkConfigCommon field and uplinkConfigCommon field and n-TimingAdvanceOffset field as ServingCellConfigCommon IE does. The ServingCellConfigCommonSIB does not include physCellId field because PCI of the cell is acquired by the UE during PBCH decoding.

The IE ServingCellConfig is used to configure (add or modify) the UE with a serving cell, which may be the SpCell or an Scell of an MCG or SCG. The parameters herein are mostly UE.

This IE contains following fields/IEs

>1: CSI-ReportConfig IE (e.g., parameters for CSI report);

>1: one or more BWP-Downlink IEs (e.g., parameters for downlink BWP); The IE BWP-Downlink is used to configure an additional downlink bandwidth part;

>1: one or more BWP-Uplink IEs (e.g., parameters for uplink BWP); The IE BWP-Uplink is used to configure an additional uplink bandwidth part; The IE BWP-Uplink contains following IEs/fields:

>>2: one or more RACH-ConfigCommon (e.g., parameters for random access procedure common for one or more UEs);

>>2: PUCCH-Config IE (e.g. parameters for PUCCH);

>>2: SRS-Config IE (e.g. parameters for SRS);

>>2: BeamFailureRecoveryConfig

RadioBearerConfig is used to add, modify and release signalling, multicast MRBs and/or data radio bearers.

RadioBearerConfig contains at least following IEs:

>1: Zero or more SRB-ToAddMod (parameters for SRB configuration) IEs; Each of SRB-ToAddMod IE includes following fields/IEs for a SRB:

>>2: srb-Identity field; this field includes information corresponding to a specific integer; the integer is the identifier of the SRB;

>>2: reestablishPDCP field; this field includes an enumerated value indicating 'true';

>>2: discardOnPDCP field: this field includes an enumerated value indicating 'trune';

>>2: pdcp-Config field: this field includes PDCP-Config IE (e.g., configurable PDCP parameters);

>1: Zero or more DRB-ToAddMod (parameters for DRB configuration) IEs; Each of DRB-ToAddMod IE includes following fields/IEs for a DRB:

>>2: drb-Identity field; this field includes information corresponding to a specific integer; the integer is the identifier of the DRB;

>>2: reestablishPDCP field; this field includes an enumerated value indicating 'true';

>>2: recoverPDCP field: this field includes an enumerated value indicating 'trune';

>>2: pdcp-Config field: this field includes PDCP-Config IE (e.g., configurable PDCP parameters);

reestablishPDCP field indicates that PDCP should be re-established. Network sets this to true whenever the security key used for this radio bearer changes. If this field is included for a DRB or for a SRB, UE performs PDCP entity re-establishment procedure. In PDCP entity re-establishment procedure, UE initializes PDCP variables and changes the security keys and performs retransmission or transmission of stored PDCP SDUs after header compression.

recoverPDCP field indicates that PDCP should perform recovery. If this field is included for a DRB, UE performs retransmission of all the PDCP Data PDUs previously submitted to re-established or released AM RLC entities in ascending order of the associated COUNT values for which the successful delivery has not been confirmed by lower layers.

discardOnPDCP field indicates that PDCP should discard stored SDU and PDU. If this field is included for a SRB, UE discards all stored PDCP SDUs and PDCP PDUs of the SRB.

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included.

This IE includes following fields/IEs:

>1: carrier field indicates in which serving cell the CSI-ResourceConfig indicated below are to be found. If the field is absent, the resources are on the same serving cell as this report configuration.

>1: reportConfigType field indicates time domain behavior of reporting configuration. This field includes following IEs >>2: one or more PUCCH-CSI-Resource; each PUCCH-CSI-Resource IE indicates PUCCH resource to be used for CSI reporting;

>1: reportQuantity field indicates the CSI related quantities to report.

>1: reportSlotConfig indicates periodicity and slot offset

>1: resourcesForChannelMeasurement field contains a CSI-ResourceConfigId. This field indicates resources for channel measurement. Csi-ResourceConfigId of a CSI-ResourceConfig included in the configuration of the serving cell indicated with the field "carrier" above.

The IE SchedulingRequestResourceConfig determines physical layer resources on PUCCH where the UE may send the dedicated scheduling request. This IE includes information on periodicity and offset and information on PUCCH resource.

The IE PUCCH-Config is used to configure UE specific PUCCH parameters (e.g., per BWP). This IE includes one or more PUCCH resource. Each of one or more PUCCH resource includes information on frequency resource for the PUCCH resource (e.g., startingPRB) and time resource for the PUCCH resource (e.g., nrofSymbols, startingSymbol Index).

The IE SRS-Config is used to configure sounding reference signal transmissions. The configuration defines a list of SRS-Resources, a list of SRS-PosResources, a list of SRS-PosResourceSets and a list of SRS-ResourceSets. Each resource set defines a set of SRS-Resources or SRS-PosResources.

The IE RACH-ConfigCommon is used to specify the cell specific random-access parameters.

This IE contains followings:

>1: parameters for PRACH occasions;

>1: parameters for preambles;

>1: parameters for random access response;

>1: parameters for contention resolution;

>1: parameters for power control (for preamble transmission power and Msg3 transmission power);

The IE RACH-ConfigDedicated is used to specify the dedicated random access parameters.

>1: parameters for PRACH occasions for dedicate usage;

>1: parameters for preamble for dedicate usage.

ReconfigurationWithSync IE contains various parameters related to synchronous reconfiguration. It includes:

>1: cell specific serving cell configuration for the target SpCell;

>>2: common RACH configuration to be applied in the target SpCell.

>1: dedicate RACH occasions and preamble to be applied to the random access procedure triggered for synchronous reconfiguration.

System information is broadcasted in a cell periodically. System information contains various information required for UEs in the cell to perform various activities.

System Information (SI) consists of a MIB and a number of SIBs, which are divided into Minimum SI and Other SI:

MIB contains cell barred status information and essential physical layer information of the cell required to receive further system information, e.g. CORESET #0 configuration. MIB is periodically broadcast on BCH.

SIB1 defines the scheduling of other system information blocks and contains information required for initial access. SIB1 is also referred to as Remaining Minimum SI (RMSI) and is periodically broadcast on DL-SCH or sent in a dedicated manner on DL-SCH to UEs in RRC_CONNECTED.

SIB2 and SIB3 and SIB4 and SIB5 contain information for mobility (e.g. information on serving frequency and neighbouring cells).

SIB6 and SIB7 contain ETWS notifications;

SIB10 and SIB11 and SIB16 and SIB17 contain various information applicable for specific UEes such as Human-Readable Network Names (HRNN) of the NPNs and information related to idle/inactive measurements and information related to disaster roaming etc.

SIB19 contains a NTN-specific parameter. More specifically, SIB19 contains t-service field and t-stop field and t-start field.

t-Service field indicates the time information on when a cell provided via NTN quasi-Earth fixed system is going to stop serving the area it is currently covering. The field indicates a time in multiples of 10 ms after 00:00:00 on Gregorian calendar date 1 Jan. 1900 (midnight between Sunday, Dec. 31, 1899 and Monday, Jan. 1, 1900). The exact stop time is between the time indicated by the value of this field minus 1 and the time indicated by the value of this field.

T-stop indicates the exact time on when a cell provided by a current satellite is going to stop serving the area it is currently covering. The field indicates a subframe number and a SFN. Alternatively or additionally, the field indicates a time in multiple of 1 ms after the time indicated by the t-Service minus 1 (e.g., the value 0 of t-stop corresponds to the time indicated by t-Service minus 1).

t-start indicates the time information on when a cell provided by another satellite different from the current satellite in NTN quasi-Earth fixed system is going to start serving the area currently covered by the current satellite. The field indicates a time in multiples of 1 ms. The exact stop time is after the time indicated by the t-stop (e.g., the value 0 of t-start corresponds to the time indicated by t-stop).

T-stop is the time point when the old satellite stops service on the geographical area covered by the current serving cell.

T-start is the time point when the new satellite starts service on the geographical area covered by the current serving cell.

Figure 1F:
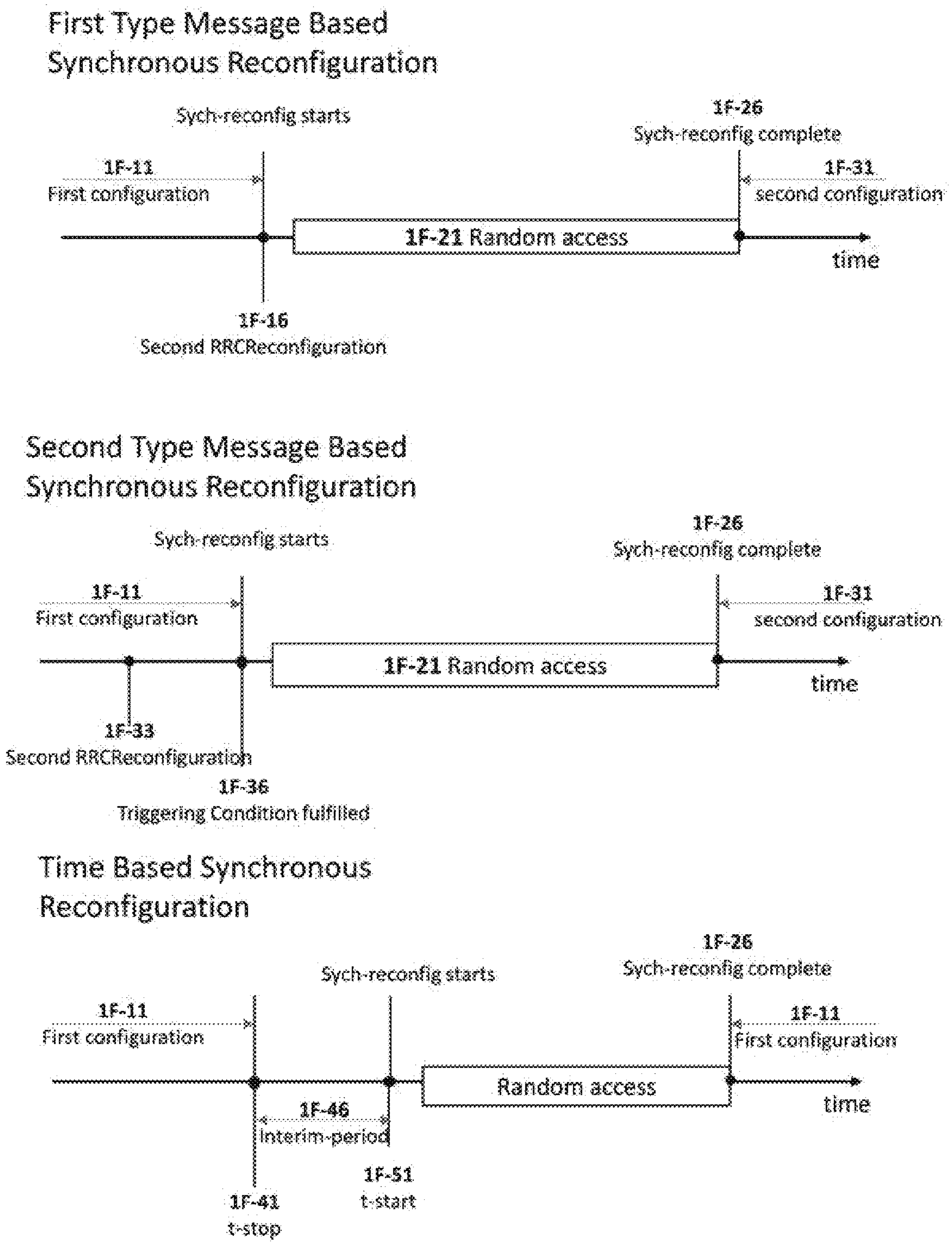
FIG. 1F is a diagram illustrating various synchronous reconfigurations.

FIG. 1F illustrates a first type synchronous reconfiguration (e.g., MBSR) and a second type synchronous reconfiguration (e.g., TBSR).

A cell ID (e.g., PCI) may be changed in the first type synchronous reconfiguration (e.g., MBSR). MBSR is a synchronous reconfiguration from a source cell to a target cell with a cell ID change. PCI and frequency information for SSB (e.g. ARFCN for Cell Defining-SSB) of the target cell is provided in the RRC message instructing the synchronous reconfiguration.

A cell ID (e.g., PCI) may not be changed in the second type synchronous reconfiguration (e.g., TBSR). TBSR is a synchronous reconfiguration from a source cell to a target cell without a cell ID change. PCI and frequency for SSB (e.g. ARFCN for Cell Defining-SSB) of the target cell is identical with the PCI and frequency for SSB of the source cell. In at least some implementations, the coverages of the source cell and the target cell may be substantially same.

A first type MBSR may be a procedure where a HO command (e.g. second RRCReconfiguration) takes the effect immediately when the HO command is received.

A second type MBSR may be a procedure where a HO command takes the effect when certain conditions specified in the HO command are fulfilled.

The TBSR may be a procedure where synchronous reconfiguration occurs at a specific time point. The specific time point may not be indicated by second RRCReconfiguration. The specific time point can be indicated by a RRC message or by a system information. In TBSR, explicit HO command may not be used. UE may determine whether to perform TBSR or not based on presence of specific information in specific system information.

In the first type MBSR procedure, the UE may perform one or more of the following operations:

>1: apply the first configuration in a first SpCell 1F-11 until a second RRCReconfiguration is received;

>>2: The second RRCReconfiguration 1F-16 includes a ReconfigurationWith Sync;

>1: perform random access procedure in a second SpCell 1F-21 based on:

>>2: RACH-ConfigCommon in the second RRCReconfiguration; and

>>2: RACH-ConfigDedicated in ReconfigurationWithSync;

>1: apply the second configuration in the second SpCell 1F-31 after completion of the synchronous reconfiguration procedure 1F-26;

>>2: The second configuration is indicated in the second RRCReconfiguration;

>>2: The synchronous reconfiguration procedure is completed when the random access procedure triggered for the synchronous reconfiguration procedure is completed.

In the second type MBSR procedure, the UE may perform one or more of the following operations:

>1: apply the first configuration 1F-11 in a first SpCell until triggering conditions are fulfilled 1F-36;

>>2: The second RRCReconfiguration 1F-33 includes a Reconfiguration WithSync and information on triggering conditions;

>1: perform random access procedure 1F-21 in a second SpCell based on:

>>2: RACH-ConfigCommon in the second RRCReconfiguration; and

>>2: RACH-ConfigDedicated in the Reconfiguration WithSync;

>1: apply the second configuration in the second SpCell 1F-31 after completion of the synchronous reconfiguration procedure 1F-26;

>>2: The second configuration is indicated in the second RRCReconfiguration;

>>2: The synchronous reconfiguration procedure is completed when the random access procedure triggered for the synchronous reconfiguration procedure is completed.

In a second type (e.g., TBSR) procedure, the UE may perform one or more of the following operations:

>1: apply the first configuration 1F-11 in a first SpCell until t-stop 1F-41;

>1: apply interim-period 1F-46 from t-stop 1F-41 to t-start 1F-51;

>1: perform random access procedure 1F-21 in a second SpCell based on:

>>2: RACH-ConfigCommon in system information received in the first SpCell (or RACH-ConfigCommon in the RRCSetup); and >>2: PDCCH order received in the first SpCell before t-stop;

>1: apply the first configuration 1F-11 in the second SpCell after completion of the synchronous reconfiguration procedure 1F-26;

>>2: The first configuration is indicated in the first RRCReconfiguration and in the RRCSetup;

>>2: The synchronous reconfiguration procedure is completed when the random access procedure triggered for the synchronous reconfiguration procedure is completed.

In the first type synchronous reconfiguration (e.g., MBSR), the UE may transmit, in the second SpCell at the first PUSCH transmission, MAC PDU containing a RRC message (e.g., RRCReconfigurationComplete) and a MAC CE on a second C-RNTI (e.g., C-RNTI MAC CE).

In the second type synchronous reconfiguration (e.g., TBSR), the UE may transmit, in the second SpCell at the first PUSCH transmission, two or more MAC CEs: a MAC CE on a first C-RNTI (e.g., C-RNTI MAC CE) and a MAC CE for Timing Advance Report and a MAC CE for BSR (if uplink resource can accommodate the MAC CE for BSR).

Figure 2A:
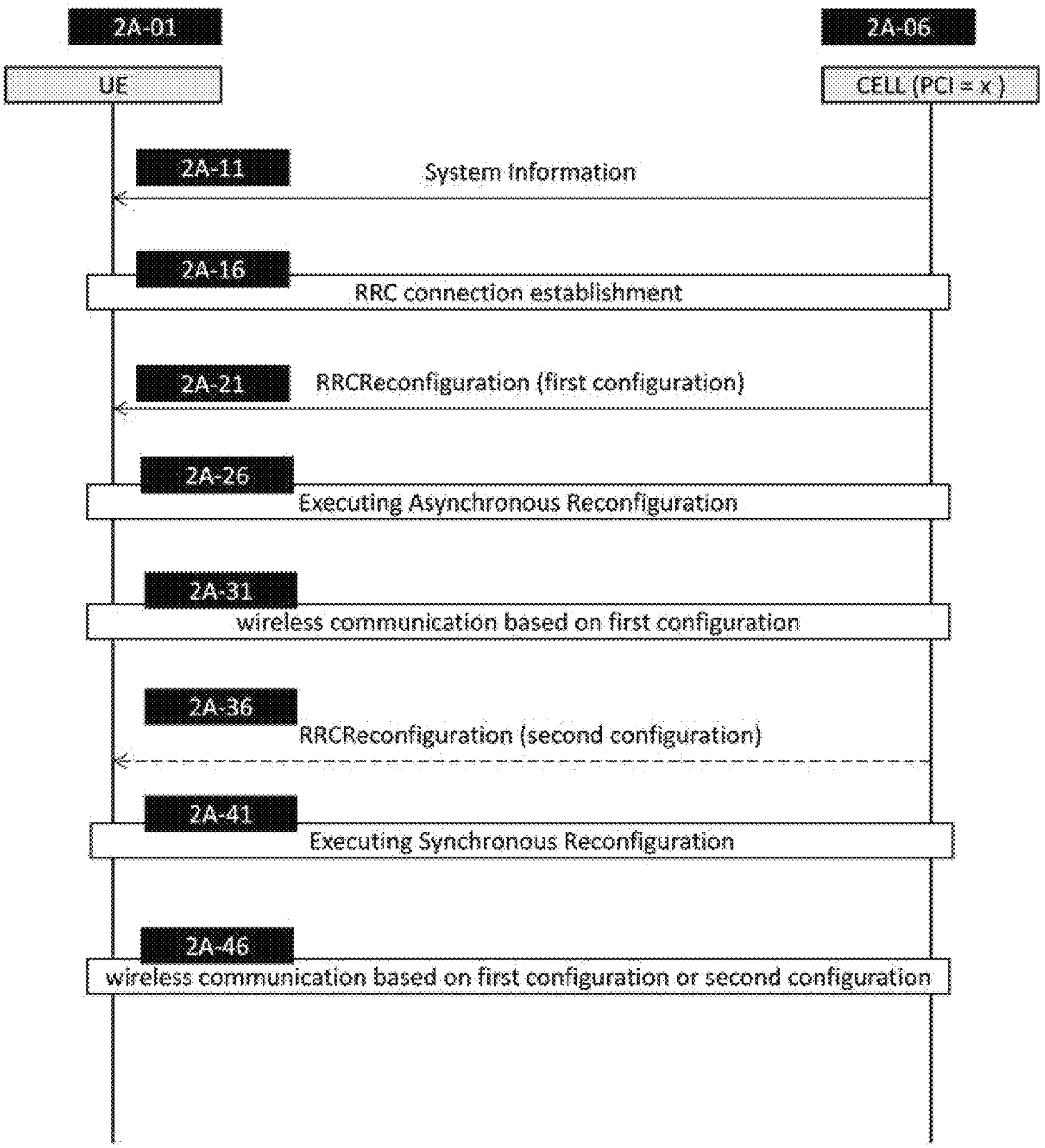
FIG. 2A is a diagram illustrating operations of a terminal and a base station according to an embodiment of the present invention.

FIG. 2A illustrates the operation of a UE and a base station described herein.

A UE 2A-01 is camping on a CELL1 2A-06. The CELL 1 is served by a satellite 1. PCI x is applied to the CELL 1.

At 2A-11, a UE may receive system information in the CELL 1. The system information includes ServingCellConfigCommonSIB to be applied by the UE in the CELL 1.

At 2A-16, a UE may perform a RRC connection establishment procedure with a base station. The UE and the base station may establish SRB1 during the RRC connection establishment procedure. The CELL 1 becomes SpCell of the UE after RRC connection establishment procedure.

In the RRC connection establishment procedure, the UE may receive from the base station an RRC setup message (e.g., a RRCSetup). The RRCSetup may include ServingCellConfig to be applied by the UE in the CELL1. The RRRCSetup may include RadioBearerConfig for SRB1.

After SRB1 establishment, UE may report its capability to the base station. The base station may decide the configuration to be applied to the UE based on the UE capability and traffic load status and traffic requirement. UE may report in which frequency band it supports TBSR.

At 2A-21, The base station may transmit a first RRCReconfiguration to the UE. The first RRCReconfiguration may include following IEs/fields:

>1: ServingCellConfig (or one or more fields contained in the IE); this IE, if included, replaces ServingCellConfig (or one or more field contained in the IE) received in RRCSetup;

>1: RadioBearerConfig; UE and base station establishes SRB2 and SRB4 based on this IE;

>1: MeasConfig;

At 2A-26, UE and the base station may perform/execute asynchronous reconfiguration procedure based on the configuration information included in the first RRCReconfiguration.

The UE and the base station may determine to perform asynchronous reconfiguration procedure if the corresponding RRCReconfiguration does not include Reconfugration WithSync IE.

The UE may apply the configuration information in the first RRCReconfiguration at time_point_1 and the base station may apply the configuration information at time_point_2. The time_point_1 may be a first time point (e.g., a time point associated with a time when UE decodes the configuration information). The time_point_2 may be a second time point (e.g., a time point associated with a time when the base station considers transmission of the RRCReconfiguration containing the configuration information is successful (e.g. when HARQ ACK for the RRCReconfiguration is received)).

After completion of the asynchronous reconfiguration procedure, the UE and the base station may perform wireless communication based on the following configuration 2A-31.

>1: ServingCellConfigCommonSIB received in the SIB1 of the CELL1 (if ServingCellConfigCommon is not provided in RRCSetup) or ServingCellConfigCommon in RRCSetup;

>1: ServingCellConfig received in the RRCSetup (if the first RRCReconfgiration does not include ServingCellConfig) or in the first RRCReconfiguration (if the first RRCReconfiguration includes ServingCellConfig);

>1: RadioBearConfig received in the first RRCReconfiguration or in the RRCSetup;

The UE may perform following operation based on ServingCellConfigCommonSIB received in the SIB1 of the CELL1:

>1: initial BWP determination based on downlinkConfigCommon and uplinkConfigCommon;

>1: contention based random access procedure in the initial BWP based on RACH-ConfigCommon;

>1: uplink timing alignment based on n-TimingAdvanceOffset;

The UE may perform following operations based on ServingCellConfig received in the RRCSetup or in the first RRCReconfiguration:

>1: BWP switching based on one or more BWP configuration information;

>1: CSI reporting based on CSI-ReportConfig;

>1: Scheduling Request based on SchedulingRequestResourceConfig;

>1: SRS transmission based on SRS-Config;

>1: TimeAlignmentTimer maintenance (e.g. setting the value of the timer) based on timeAlignmentTimer field for TAG 0

The UE may perform one or more of the following operations based on RadioBearConfig received in the first RRCReconfiguration:

>1: RRC message transmission and reception via SRB1 based on SRBToAddMod in RRCSetup;

>1: RRC message transmission and reception via SRB2 and or SRB4 based on SRBToAddMod IEs in the first RRCReconfiguration;

>1: IP packet transmission and reception via DRBs based on DRBToAddMod IEs in the first RRCReconfiguration.

When service link switch is pending, the base station may prepare to reconfigure UEs in a cell served by the first satellite to the cell served by the second satellite.

There are at least three ways to do it; either via first type message based synchronous reconfiguration (MBSR) or via second type MBSR or via time based synchronous reconfiguration (TBSR).

If the base station determines to apply UE first type MBSR or second type MBSR, the base station may transmit UE a second RRCReconfiguration at 2A-36.

The second RRCReconfiguration may include a ReconfigurationWithSync and a ServingCellConfig.

If the base station determines to apply UE TBSR, the base station may not transmit UE the second RRCReconfiguration. The base station may operate based on the assumption that those UEs will perform TBSR based on the information indicated in the system information.

At 2A-41, UE and the base station perform/execute synchronous reconfiguration. The synchronous reconfiguration could be either first type MBSR or second type MBSR or TBSR.

After completion of the synchronous reconfiguration procedure, the UE and the base station may perform wireless communication based on the first configuration described herein (in case of TBSR) or the second configuration described herein (in case of MBSR) in CELL2 2A-46. Further, examples of the first configuration for TBSR and the second configuration for MBSR may be implemented as follows.

First configuration information may include one or more parameters and/or IEs as below:

>1: ServingCellConfigCommonSIB received in the SIB1 of the CELL1 or ServingCellConfigCommon received in RRCSetup;

>>2: The ServingCellConfigCommonSIB is received before t-stop (or alternatively the ServingCellConfigCommonSIB is reacquired after t-start);

>1: ServingCellConfig received in the RRCSetup (if the first RRCReconfgiration does not include ServingCellConfig) or in the first RRCReconfiguration (if the first RRCReconfiguration includes ServingCellConfig);

>>2: The RRCSetup or the first RRCReconfiguration is received in the CELL1 before t-stop;

>1: RadioBearConfig received in the RRCSetup and in the first RRCReconfiguration;

>>2: RadioBearerConfig in the RRCSetup contains SRBToAddMod for SRB1;

>>2: RadioBearerConfig in the first RRCReconfiguration contains SRBToAddMods for SRB2 and SRB4 and DRBToAddMod for DRBs;

Second configuration information may include one or more parameters and/or IEs as below:

>1: ServingCellConfigCommon received in ReconfigurationWithSync in the second RRCReconfiguration;

>1: ServingCellConfig received in the second RRCReconfiguration;

>1: RadioBearConfig received in the second RRCReconfiguration;

A UE may perform one or more of the followings before/during/after MBSR.

Upon reception of second RRCReconfiguration, UE may:

start timer T304;

stop PDCCH monitoring;

start synchronising to the DL of the cell indicated in ReconfigurationWithSync;

initialize Bj for each logical channel to zero;

stop (if running) all timers;

consider timeAlignmentTimers as expired;

perform TAT_expire_operation_1;

set the NDIs for all uplink HARQ processes to the value 0;

stop, if any, ongoing Random Access procedure;

discard explicitly signalled contention-free Random Access Resources for 4-step RA type and 2-step RA type, if any;

flush Msg3 buffer;

flush MSGA buffer;

cancel, if any, triggered Scheduling Request procedure;

cancel, if any, triggered Buffer Status Reporting procedure;

cancel, if any, triggered Power Headroom Reporting procedure;

cancel, if any, triggered consistent LBT failure;

cancel, if any, triggered BFR;

cancel, if any, triggered Timing Advance Reporting procedure;

cancel, if any, triggered Recommended bit rate query procedure;

cancel, if any, triggered Configured uplink grant confirmation;

cancel, if any, triggered Positioning Measurement Gap Activation/Deactivation Request procedure;

flush the soft buffers for all DL HARQ processes, except for the DL HARQ process being used for MBS broadcast;

for each DL HARQ process, except for the DL HARQ process being used for MBS broadcast, consider the next received transmission for a TB as the very first transmission;

reset all BFI_COUNTERS;

apply the value of the newUE-Identity as the C-RNTI;

configure lower layers in accordance with the received spCellConfigCommon in Reconfiguration WithSync;

indicate TA report initiation to lower layer if ta-Report is configured with value enabled in ServingCellConfigCommon in ReconfigurationWithSync;

initiate random access procedure based on ReconfigurationWithSync;

stop T304 when random access procedure is successfully completed;

apply, based on the configuration in Reconfiguration WithSync, the parts of the CSI reporting configuration, the scheduling request configuration and the sounding RS configuration that do not require the UE to know the SFN of the respective target SpCell;

apply, based on the configuration in ReconfigurationWithSync, the parts of the measurement and the radio resource configuration that require the UE to know the SFN of the respective target SpCell (e.g. measurement gaps, periodic CQI reporting, scheduling request configuration, sounding RS configuration), if any, upon acquiring the SFN of that target SpCell.

A UE may perform one or more of the following operations before/during/after TBSR.

when t-start arrives, the UE may:

start timer T304 indicated in a specific system information;

start synchronizing to the DL of the cell indicated in the specific system information (or start resynchronizing to the DL of the current cell);

stop (if running) all timers;

consider timeAlignmentTimers as expired;

perform TAT_expire_operation_2;

stop, if any, ongoing Random Access procedure;

discard explicitly signalled contention-free Random Access Resources for 4-step RA type and 2-step RA type, if any;

flush Msg3 buffer;

flush MSGA buffer;

cancel, if any, triggered Power Headroom Reporting procedure;

cancel, if any, triggered BFR;

cancel, if any, triggered Timing Advance Reporting procedure;

reset all BFI_COUNTERS;

configure lower layers in accordance with ServingCellConfigCommon in the specific system information;

indicate TA report initiation to lower layer if ta-Report is configured with value enabled in the specific system information;

initiate random access procedure based on the specific system information;

stop T304 when random access procedure is successfully completed;

apply, based on the configuration in ServingCellConfig in RRCReconfiguration without ReconfigurationWithSync, the parts of the CSI reporting configuration, the scheduling request configuration and the sounding RS configuration that do not require the UE to know the SFN;

apply, based on the configuration in ServingCellConfig in RRCReconfiguration without ReconfigurationWithSync, the parts of the measurement and the radio resource configuration that require the UE to know the SFN (e.g. measurement gaps, periodic CQI reporting, scheduling request configuration, sounding RS configuration), if any, upon re-acquiring the SFN;

UE performs followings for synchronous reconfiguration procedure.

>1: UE applies a first configuration before synchronous reconfiguration;

>1: UE initiates synchronous reconfiguration;

>1: UE applies a second configuration after synchronous reconfiguration;

>1: If the synchronous reconfiguration is a first type reconfiguration (MBSR):

>>2: the first configuration is provided by a first RRCReconfiguration and the second configuration is provided by a second RRCReconfiguration;

>>2: the time point for the synchronous reconfiguration execution is determined based on reception second RRCReconfiguration;

>1: If the synchronous reconfiguration is a second type reconfiguration (TBSR):

>>2: the first configuration and the second configuration are same;

>>2: the first configuration is provided by the first RRCReconfiguration;

>>2: the time point for the synchronous reconfiguration execution is determined based on a specific information received in a system information.

>1: synchronous reconfiguration is reconfiguration for which random access procedure is performed after the reconfiguration is executed and before the reconfiguration is completed.

The first configuration and the second configuration may include one or more parameters and/or IEs, such as the followings:

>1: ServingCellConfigCommon; and

>1: ServingCellConfig; and

>1: RadioBearerConfig.

The UE may perform one or more of the following opeartions for synchronous reconfiguration procedure.

>1: UE determines whether to execute the first type reconfiguration or the second type reconfiguration;

>1: UE performs reconfiguration of determined type;

>1: the second type reconfiguration is performed:

>>2: if the system information includes information related to the second type reconfiguration; and >>2: if the UE supports the second type reconfiguration; and >>2: if the first type reconfiguration is not executed until a specific time point (stop-time)

>1: the first type reconfiguration is performed:

>>2: if the system information does not include information related to the second type reconfiguration; or >>2: if the UE does not support the second type reconfiguration; or >>2: if the first type reconfiguration is executed before the specific time point.

The system information is received in a first cell before a specific time point (t-stop) or before synchronous reconfiguration is executed. The specific time point is indicated in the system information.

The information related to the second type reconfiguration may be:

>1: one bit indication; or

>1: t-start; or

>1: NTN-Config to be used after t-start.

That the first type reconfiguration is not executed until a specific time point means that:

>1: a second RRCReconfiguration including ReconfigurationWithSync and not including accompanying triggering conditions is not received until the specific point of time; or >1: one or more triggering conditions associated with a RRCReconfiguration for conditional reconfiguration is not fulfilled until the specific point of time.

During synchronous reconfiguration, data in PDCP buffer need to be managed such that:

>1: PDCP SDUs that should not be transmitted after synchronous reconfiguration are not transmitted after synchronous reconfiguration;

>1: PDCP SDUs that should be retransmitted after synchronous reconfiguration are retransmitted after synchronous reconfiguration;

>1: PDCP SDUs that should be processed again with new security key are processed again after synchronous reconfiguration.

GNB explicitly indicates, in the second RRCReconfiguration, for each radio bearer how to manage the PDCP SDUs in the PDCP buffer.

If security key is maintained after synchronous reconfiguration, GNB may include recoverPDCP DRBToAddMod to trigger PDCP data recovery procedure and include DiscardOnPDCP in SRBToAddMod to trigger PDCP data discard.

If security key changes, GNB may include reestablishPDCP in SRBToAddMod and DRBToAddMod to trigger PDCP re-establishment procedure.

Those fields are indicated to the UE in the second RRCReconfiguration.

In case of TBSR, since the second RRCReconfiguration is not used, UE performs relevant operation based on predefined rules.

In case of TBSR (e.g., if system information includes TBSR related information), UE considers/assumes:

>1: For SRB1 and SRB3;

>>2: DiscardOnPDCP is considered to be (implicitly) indicated/included (e.g., UE performs PDCP discard operation for SRB1 and SRB3 after t-stop even if DiscardOnPDCP is not included in the SRBToAddMod containing PDCP-config for the corresponding SRB);

>>2: If SRBToAddMod for SRB1 (or SRB3) includes a PDCP-config and does not include DiscardOnPDCP;
>>>3: UE performs transmission and reception of PDCP SDU of SRB1 (or SRB3) before t-stop based on:
>>>>4: the PDCP-config; and
>>>>4: that DiscardOnPDCP is not included;
>>>3: UE performs transmission and reception of PDCP SDU of SRB1 (or SRB3) after t-stop based on:
>>>>4: the PDCP-config; and
>>>>4: that DiscardOnPDCP is included;
>>>3: It is to prevent PDCP SDUs in SRB1 and SRB3 containing useless (harmful) RRC messages to be retransmitted after TBSR;
>>2: reestablishPDCP is considered to be (implicitly) not indicated/included. (e.g., UE does not perform PDCP reestablishment for SRB1 and SRB3 after t-stop even if reestablishPDCP is included in the corresponding SRB-ToAddMod).
>1: For SRB2 and SRB4;
>>2: DiscardOnPDCP is considered to be (implicitly) not indicated/included (e.g., UE does not perform PDCP discard operation for SRB2 and SRB4 after t-stop even if DiscardOnPDCP is included in the SRBToAddMod containing PDCP-config for the corresponding SRB);
>>2: If SRBToAddMod for SRB2 (or SRB4) includes a PDCP-config and DiscardOnPDCP;
>>>3: UE performs transmission and reception of PDCP SDU of SRB2 (or SRB4) before t-stop based on:
>>>>4: the PDCP-config; and
>>>>4: that DiscardOnPDCP is included;
>>>3: UE performs transmission and reception of PDCP SDU of SRB2 (or SRB4) after t-stop based on:
>>>>4: the PDCP-config; and
>>>>4: that DiscardOnPDCP is not included;
>>>3: It is to prevent PDCP SDUs in SRB2 and SRB4 containing useful RRC messages to be discarded after TBSR;
>>2: reestablishPDCP is considered to be (implicitly) not indicated/included. (e.g., UE does not perform PDCP reestablishment for SRB2 and SRB4 after t-stop even if reestablishPDCP is included in the corresponding SRB-ToAddMod).
>1: For DRBs;
>>2: reestablishPDCP is implicitly not indicated/included (e.g. UE does not perform PDCP reestablishment for DRBs after t-stop even if reestablishPDCP is not included in the DRBToAddMod containing PDCP-Config for the corresponding DRB);
>>2: recoverPDCP is implicitly indicated/included (e.g. UE does not perform PDCP reestablishment for DRBs after t-stop even if reestablishPDCP is not included in the DRBToAddMod containing PDCP-Config for the corresponding DRB);

The UE may perform one or more of the following operations for PDCP buffer management during synchronous reconfiguration.

>1: UE initiates synchronous reconfiguration;
>1: UE performs PDCP SDU management based on explicit indication at first time point in case of MBSR;
>1: UE performs PDCP SDU management based on predefined rules at second time point in case of TBSR;

A time alignment timer (TAT) may be a timer to determine a time in which an uplink transmission timing is valid (e.g., an indication until when uplink transmission timing is valid). In an OFDM based system, uplink signals should arrive within a specific time span. Otherwise, interference between uplink signals form different UEs could occur. To avoid the unnecessary interference, uplink transmission timing of a UE is established when a timing advance command for the UE is received. Based on the assumption that the UE with the established uplink transmission timing will not move excessively (such that uplink synchronization is broken) during a certain period of time, a UE starts TAT when timing advance command is received. The UE may consider uplink is synchronized while TAT is running. A UE may be allowed to perform uplink transmission except PRACH only while TAT is running.

During synchronized reconfiguration for mobility, UE release the uplink resource that are used in the source cell by stopping TAT in the source cell. It is a reasonable behavior for the first type reconfiguration (e.g., MBSR) where the uplink resource configuration in the target cell and the uplink resource configuration in the source cell would likely be different. However, in case of the second type reconfiguration (e.g., TBSR), since at least some of the uplink resource configuration would likely be the same in the source cell and in the target cell, releasing those uplink resources may incur unnecessary interruption and an additional RRC message exchange (for uplink resource allocation).

To avoid aforementioned problem, depending on the type of synchronous reconfiguration, the UE and the base station (e.g., GNB) may perform different set of operations in handling uplink resource before/during/after the synchronous reconfiguration.

The UE may receive a first configuration from the base station. The first configuration may be the first RRC reconfiguration message (e.g., the first RRCReconfiguration). The UE may perform uplink transmission (e.g., sending an uplink message to the base station) while a TAT is running. In an example, the UE may transmit a CSI report based on a CSI reporting configuration in the first configuration. In an example, the UE may transmit a scheduling request based on one or more parameters and/or resources configured in the first configuration (e.g., one or more parameters and/or resources in PUCCH-Config in the first RRCReconfiguration). In an example, the UE may perform an SRS transmission based on one or more parameters and/or resources configured in the first configuration (e.g., one or more parameters and/or resources in SRS-Config in the first RRCReconfiguration).

At least some uplink resources (e.g., a PUCCH resource, an SRS resource, and/or a CG resource) may be configured via the first configuration. The at least some uplink resources (e.g., a PUCCH resource, an SRS resource, and/or a CG resource) may be maintained, for example, based on the second type reconfiguration (e.g., TBSR), after stopping TAT. After completing the second type reconfiguration, uplink transmission from the UE to the base station may be performed using the at least some uplink resources maintained.

The at least some uplink resources (e.g., a PUCCH resource, an SRS resource, and/or a CG resource) may be discarded, for example, based on the first type reconfiguration (e.g., MBSR), after stopping TAT. After completing the second type reconfiguration, uplink transmission from the UE to the base station may be performed using reconfigured uplink resources (e.g., a PUCCH resource, an SRS resource, and/or a CG resource reconfigured after discarding the previously configured at least some uplink resources).

After the uplink transmission (e.g., based on the first configuration while a TAT is running), a synchronous reconfiguration condition (e.g., a switching condition, such as NTN-NTN mobility, a satellite switching condition, etc.) may be satisfied. For example, after the uplink transmission (e.g., based on the first configuration while a TAT is running), the UE may initiate a synchronous reconfiguration procedure (e.g., based on the first type reconfiguration or the second type reconfiguration). The UE may initiate the synchronous reconfiguration toward a target cell (e.g., a switching toward a new satellite from an old satellite). The UE may also stop the TAT. TAT may restart during random access procedure in the target cell. The synchronous reconfiguration may be performed when a switching from an old satellite (e.g., a source satellite) to a new satellite (e.g., a target satellite) needs to be performed. After the satellite switching is performed, the base station may be maintained (e.g., the base station communicates with the UE via the old satellite and then the base station communicates with the UE via the new satellite) or may be changed to a new base station. For the second type synchronous reconfiguration (e.g., TBSR), if the base station is maintained after the satellite switching, the same cell identifier may be maintained. For the second type synchronous reconfiguration (e.g., TBSR), the same synchronization signal block (SSB) frequency may also be maintained before/during/after the synchronous reconfiguration.

For the synchronous reconfiguration procedure, the UE may receive the second configuration (e.g., the second RRCReconfiguration), for example, if the synchronous reconfiguration is the first type synchronous reconfiguration (e.g., MBSR). The second configuration may be received via the source cell (e.g., via a cell configured via a source satellite). For the synchronous reconfiguration procedure, the UE may not receive the second configuration (e.g., the second RRCReconfiguration), for example, if the synchronous reconfiguration is the second type synchronous reconfiguration (e.g., TBSR). The second type synchronous reconfiguration (e.g., TBSR) may be more efficient at least because it does not require the signaling of the second configuration (e.g., the second RRCReconfiguration).

The UE may perform one or more first operations, for example, based on the synchronous reconfiguration being the first type synchronous reconfiguration (e.g., MBSR). The one or more first operations may include at least one of: a release of one or more CSI resources (e.g., PUCCH-CSI-Resources configured in CSI-ReportConfig) received in the first configuration (e.g., the first RRCReconfiguration), a release of one or more SR resources (e.g., SchedulingRequestResourceConfig instances configured in PUCCH-Config) received in the first configuration (e.g., the first RRCReconfiguration), and/or a release of one or more SRS resources (e.g., SRS-Resource instances configured in SRS-Config) received in the first configuration (e.g., the first RRCReconfiguration).

The UE may perform one or more second operations, for example, based on the synchronous reconfiguration being the second type synchronous reconfiguration (e.g., TBSR). The one or more second operations may include at least one of: stopping CSI reporting on one or more CSI resources (e.g., PUCCH-CSI-Resources configured in CSI-ReportConfig) received in the first configuration (e.g., the first RRCReconfiguration) and keeping the one or more CSI resources, stopping and/or canceling a scheduling request on one or more SR resources (e.g., SchedulingRequestResourceConfig instances configured in PUCCH-Config) received in the first configuration (e.g., the first RRCReconfiguration) and keeping the one or more SR resources, and/or stopping an SRS transmission on one or more SRS resources (e.g., SRS-Resource instances configured in SRS-Config) received in the first configuration (e.g., the first RRCReconfiguration) and keeping the one or more SRS resources.

The UE may start CSI reporting, send a scheduling request, and/or perform an SRS transmission, for example, after completing the synchronous reconfiguration.

The UE may perform an uplink transmission based on the second configuration (e.g., the second RRCReconfiguration), for example, if the synchronous reconfiguration is first type synchronous reconfiguration. In an example, the UE may perform CSI reporting based on one or more CSI resources (e.g., PUCCH-CSI-Resources configured in CSI-ReportConfig) received in the second configuration (e.g., the second RRCReconfiguration). In an example, the UE may perform a scheduling request transmission based on one or more SR resources (e.g., SchedulingRequestResourceConfig instances configured in PUCCH-Config) received in the second configuration (e.g., the second RRCReconfiguration). In an example, the UE may perform an SRS transmission based on one or more SRS resources (e.g., SRS-Resource instances configured in SRS-Config) received in the second configuration (e.g., the second RRCReconfiguration).

The UE may perform (e.g., resume) an uplink transmission based on the first configuration (e.g., the first RRCReconfiguration), for example, if the synchronous reconfiguration is second type synchronous reconfiguration. In an example, the UE may perform (e.g., resume) CSI reporting based on one or more CSI resources (e.g., PUCCH-CSI-Resources configured in CSI-ReportConfig) received in the first configuration (e.g., the first RRCReconfiguration). In an example, the UE may perform (e.g., resume) a scheduling request transmission based on one or more SR resources (e.g., SchedulingRequestResourceConfig instances configured in PUCCH-Config) received in the first configuration (e.g., the first RRCReconfiguration). In an example, the UE may perform (e.g., resume) an SRS transmission based on one or more SRS resources (e.g., SRS-Resource instances configured in SRS-Config) received in the first configuration (e.g., the first RRCReconfiguration).

In some implementations, the UE may perform communication with the base station according to the following example operations.

The UE may perform one or more of the followings:

>1: UE receives from a base station a first RRCReconfiguration in a first cell;

>1: UE performs uplink transmission in the first cell while a TAT is running:

>>2: CSI reporting based on CSI-ReportConfig in the first RRCReconfiguration;

>>2: Scheduling Request based on SchedulingRequestResourceConfig instances in PUCCH-Config in the first RRCReconfiguration >>2: SRS transmission based on SRS-Resource instances in SRS-Config in the first RRCReconfiguration;

>1: UE initiates synchronous reconfiguration towards a target cell (e.g., a second cell) which may have a cell identity same as the cell identity of the source cell (e.g., the first cell) or may have a cell identity different from the cell identity of the source cell;

>1: UE stops the TimeAlignmentTimer (TAT);

>1: UE performs first set of actions if the synchronous reconfiguration is first type synchronous reconfiguration (e.g. MBSR);

>>2: first set of actions may include one or more of the followings:

>>>3: releasing PUCCH-CSI-Resources configured in CSI-ReportConfig received in the first RRCReconfiguration;

>>>3: releasing SchedulingRequestResourceConfig instances configured in PUCCH-Config received in the first RRCReconfiguration;

>>>3: releasing SRS-Resource instances configured in SRS-Config.

>1: UE performs second set of actions if the synchronous reconfiguration is second type synchronous reconfiguration (e.g. TBSR);

>>2: second set of actions may include one or more of the followings:

>>>3: stopping CSI reporting on PUCCH-CSI-Resources and keeping PUCCH-CSI-Resources configured in CSI-ReportConfig received in the first RRCReconfiguration;

>>>3: stopping scheduling request based on the SchedulingRequestResourceConfig instances and keeping SchedulingRequestResourceConfig instances configured in PUCCH-Config received in the first RRCReconfiguration;

>>>3: stopping SRS transmission on SRS-Resource instances and keeping SRS-Resource instances configured in SRS-Config.

>1: UE starts CSI reporting and Scheduling Request and SRS transmission after completion of the synchronous reconfiguration;

>>2: If the synchronous reconfiguration is first type synchronous reconfiguration, UE may perform:

>>>3: CSI reporting based on CSI-ReportConfig in the second RRCReconfiguration;

>>>3: Scheduling Request based on SchedulingRequestResourceConfig instances in PUCCH-Config in the second RRCReconfiguration >>>3: SRS transmission based on SRS-Resource instances in SRS-Config in the second RRCReconfiguration;

>>2: If the synchronous reconfiguration is second type synchronous reconfiguration, UE may resume:

>>>3: CSI reporting based on CSI-ReportConfig in the first RRCReconfiguration;

>>>3: Scheduling Request base on SchedulingRequestResourceConfig instances configured in PUCCH-Config in the first RRCReconfiguration >>>3: SRS transmission based on SRS-Resource instances configured in SRS-Config in the first RRCReconfiguration.

The UE (e.g., a wireless user device) may perform one or more operations described herein including one or more of the following operations. The UE may receive, via a first cell, a first Radio Resource Control (RRC) Reconfiguration message. The first RRC Reconfiguration message may indicate at least one parameter associated with wireless communication via the first cell. While a time alignment timer (TAT) is running, the UE may perform, via the first cell, an uplink transmission, wherein the performing the uplink transmission is based on: channel state information (CSI)-ReportConfig; SchedulingRequestConfig; and sounding reference signal (SRS)-Config. The UE may initiate synchronous reconfiguration associated with access to a second cell. The UE may, after initiating the synchronous reconfiguration, stop the TAT. The UE may perform, for the initiated synchronous reconfiguration, a first set of procedures or a second set of procedures, wherein the wireless user device may be configured to perform: the first set of procedures based on the initiated synchronous reconfiguration being associated with a first type of synchronous reconfiguration and the second set of procedures based on the initiated synchronous reconfiguration being associated with a second type of synchronous reconfiguration. The UE may, after performing the first set of procedures or the second set of procedures, perform, via the second cell, a second uplink transmission.

The UE may receive, via the first cell or a second cell, system information block (SIB) comprising at least one non-terrestrial network (NTN)-specific parameter. The at least one NTN-specific parameter may comprise at least one of: a t-service field, a t-stop field, or a t-start field. The first type of synchronous reconfiguration may be a message-based synchronous reconfiguration and the second type of synchronous reconfiguration is a time-based synchronous reconfiguration, or the first type of synchronous reconfiguration may be a time-based synchronous reconfiguration and the second type of synchronous reconfiguration is a message-based synchronous reconfiguration. The first type of synchronous reconfiguration may be a synchronous reconfiguration associated with physical cell identifier (PCI) changed procedure, and the second type of synchronous reconfiguration may be a synchronous reconfiguration associated with PCI unchanged procedure. The second set of procedures may be performed without a random access channel (RACH) procedure. The second set of procedures may comprise determine, by the wireless user device, a timer is expired at t-service. The timer may comprise a time alignment timer (TAT). The second set of procedures may be performed without a synchronization signal block (SSB) change. The second set of procedures may comprise selecting, by the wireless user device, an SSB associated with a previous SSB allocation. The second type of synchronous reconfiguration may be configured for quasi-earth fixed system.

During and after synchronous reconfiguration, UE and GNB may perform various operations for functions related to random access, HARQ, PHR, BSR, CSI and/or SRS.

Considering the difference between different synchronous reconfigurations (e.g., MBSR and TBSR), UE and GNB need to apply different set of operations for those functions.

>1: UE initiates a synchronous reconfiguration;

>1: UE performs a first operation set and a second operation set and a third operation set and a fifth operation set and a seventh operation set in response to message based synchronous reconfiguration being initiated;

>1: UE performs a first operation set and a second operation set and a fourth operation set and a sixth operation set in response to time based synchronous reconfiguration being initiated;

>1: UE performs a random access;

>1: UE completes the synchronous reconfiguration when the random access is successfully completed;

>1: The first operation set is a set of operations related to random access; The reason for performing first operation set is to facilitate random access in the target cell; The first operation set includes: The first operation set includes:

>>2: stopping ongoing Random Access procedure;

>>2: discarding explicitly signalled contention-free Random Access Resources for 4-step RA type and 2-step RA type, if any;

>>2: flushing Msg3 buffer;

>>2: flushing MSGA buffer;

>1: The second operation set is a set of operation related to first type MAC CE (e.g. BFR MAC CE and PHR MAC CE); The second operation set includes:

>>2: cancelling triggered Power Headroom Reporting procedure; The reason for this is that PHR MAC CE generated in the source cell does not carry useful information for the target cell because pathloss reference for power headroom changes;

>>2: cancelling triggered BFR; The reason for this is that BFR MAC CE generated in the source cell does not carry useful information for the target cell because beam failure may not exist in the second cell;

>1: The third operation set is a set of operations related to Buffer Status Reporting; The third operation set is only for MBSR and includes:

>>2: cancelling triggered Scheduling Request procedure; To not block random access being triggered in the target cell, scheduling request procedure triggered in the source cell is cancelled;

>>2: cancelling triggered Buffer Status Reporting procedure; To not block transmission of RRCReconfigurationComplete (logical channel priority of BSR is higher than RRCReconfigurationComplete), BSR triggered in the source cell is cancelled (e.g. discarded) before random access is initiated;

>1: The fourth operation set is a set of operations related to Buffer Status Reporting; The fourth operation set is only for TBSR and includes:

>>2: suspending triggered Scheduling Request procedure; To not block random access being triggered in the target cell, scheduling request procedure triggered in the source cell is suspended; The suspended Scheduling Request procedure is triggered again (or resumed) after random access procedure is successfully completed;

>>2: suspending triggered Buffer Status Reporting procedure; To not block transmission of RRCReconfigurationComplete (logical channel priority of BSR is higher than RRCReconfigurationComplete), BSR triggered in the source cell is not discarded but suspended until a specific point of time; Transmission of suspended BSR is resumed when random access procedure is successfully completed;

>1: 'suspending xxx' corresponds to timely sequential operation of stopping xxx at a specific time point and resuming xxx later when a certain condition is fulfilled.

>1: The fifth operation set is a set of operations related to CSI/SRS; The fifth operation set is only for MBSR and includes:

>>releasing CSI resource and SRS resource;

>1: The sixth operation set is a set of operations related to CSI/SRS; The sixth operation set is for TBSR and includes:

>>2: suspending CSI transmission and SRS transmission at t-stop;

>2: resuming CSI transmission and SRS transmission at time_point_3;

>>>3: time_point_3 is when UE acquires the SFN of the target cell (e.g. when UE decodes MIB first time since t-start)

>1: The seventh operation set is a set of operation related to HARQ buffer management; The seventh operation is to restart HARQ process in the target cell; The seventh operation set is for MBSR; Since HARQ process can continue during TBSR, the seventh operation set is not applied to TBSR; The seventh operation includes:

>>2: setting the NDIs for all uplink HARQ processes to the value 0;

>>2: flushing the soft buffers for all DL HARQ processes, except for the DL HARQ process being used for MBS broadcast;

>>2: for each DL HARQ process, except for the DL HARQ process being used for MBS broadcast, considering the next received transmission for a TB as the very first transmission.

Figure 3A:
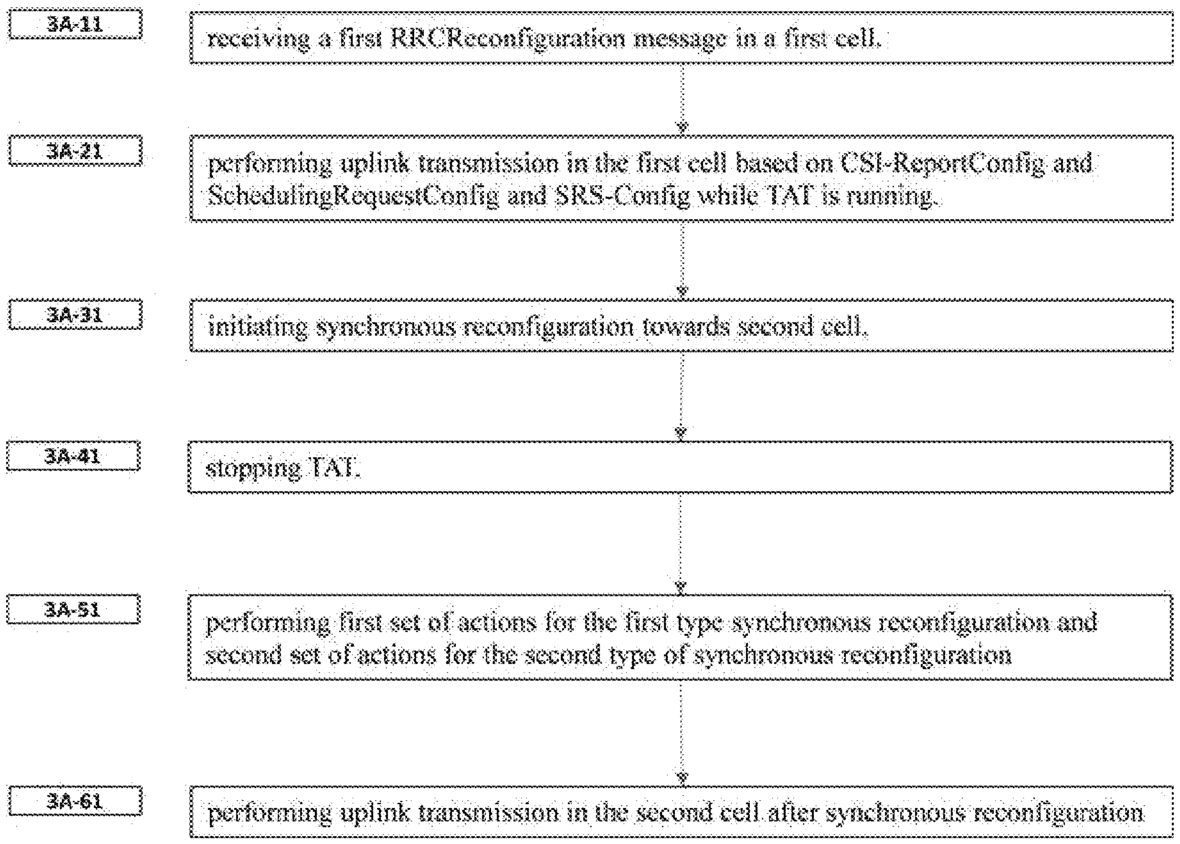
FIG. 3A is a flow diagram illustrating an operation of a terminal.

FIG. 3A illustrates operation of terminal.

At 3A-11, UE receives a first RRCReconfiguration message in a first cell.

At 3A-21, UE performs uplink transmission in the first cell based on CSI-ReportConfig and SchedulingRequestConfig and SRS-Config while TAT is running.

At 3A-31, UE initiates synchronous reconfiguration towards second cell.

At 3A-41, UE stops TAT.

At 3A-51, UE performs first set of actions for the first type synchronous reconfiguration and second set of actions for the second type of synchronous reconfiguration.

At 3A-61, UE performs uplink transmission in the second cell after synchronous reconfiguration.

Figure 4A:
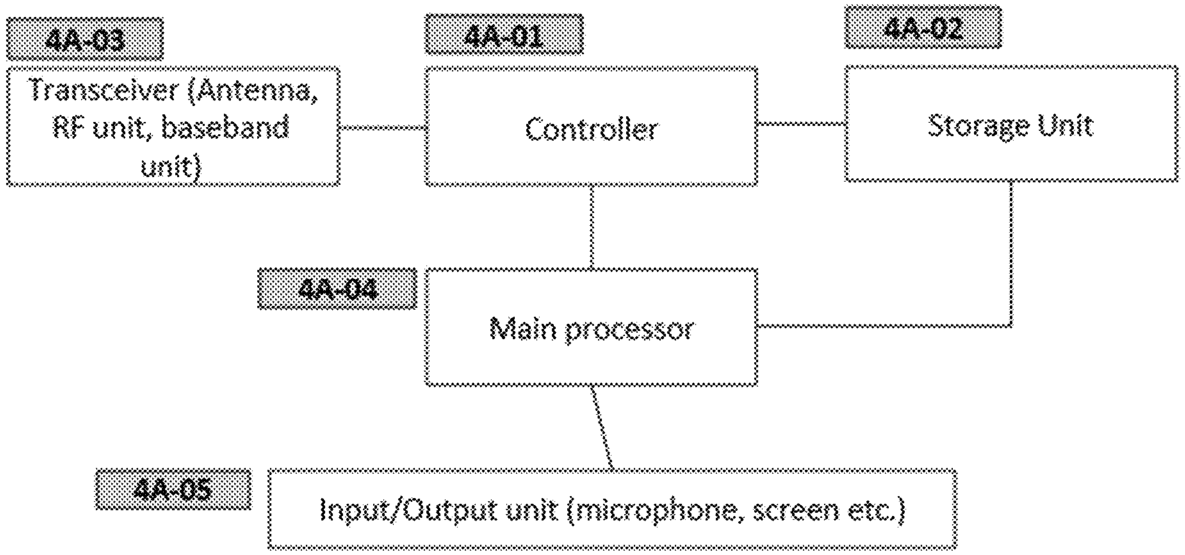
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2A and FIG. 3A are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
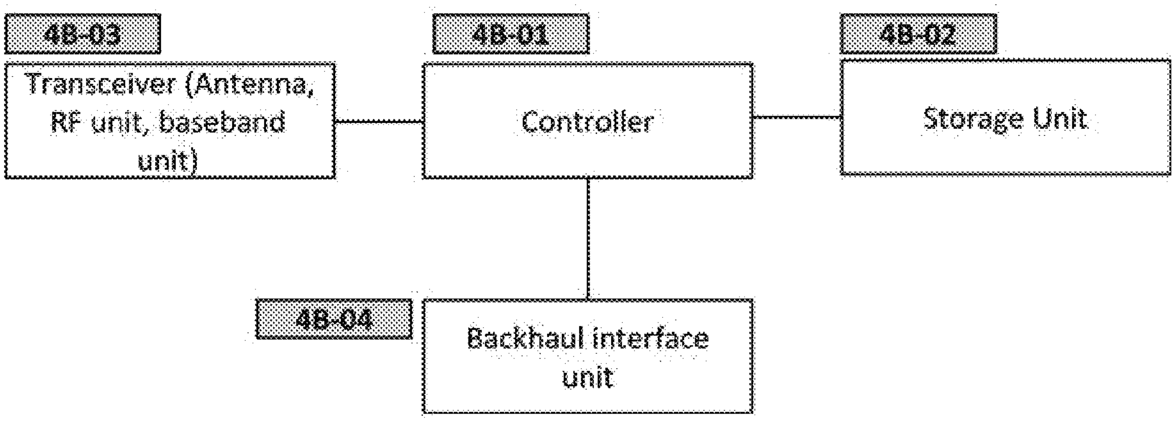
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2A are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

Below table lists acronym used in the present disclosure.

TABLE 1

| Acronym | Full name | Acronym | Full name |
|---|---|---|---|
| 5GC | 5G Core Network | RACH | Random Access Channel |
| ACK | Acknowledgement | RAN | Radio Access Network |
| AM | Acknowledged Mode | RAR | Random Access Response |
| AMF | Access and Mobility Management Function | RA-RNTI | Random Access RNTI |
| ARQ | Automatic Repeat Request | RAT | Radio Access Technology |
| AS | Access Stratum | RB | Radio Bearer |
| ASN.1 | Abstract Syntax Notation One | RLC | Radio Link Control |
| BSR | Buffer Status Report | RNA | RAN-based Notification Area |
| BWP | Bandwidth Part | RNAU | RAN-based Notification Area Update |
| CA | Carrier Aggregation | RNTI | Radio Network Temporary Identifier |
| CAG | Closed Access Group | RRC | Radio Resource Control |
| CG | Cell Group | RRM | Radio Resource Management |
| C-RNTI | Cell RNTI | RSRP | Reference Signal Received Power |
| CSI | Channel State Information | RSRQ | Reference Signal Received Quality |
| DCI | Downlink Control Information | RSSI | Received Signal Strength Indicator |
| DRB | (user) Data Radio Bearer | SCell | Secondary Cell |
| DTX | Discontinuous Reception | SCS | Subcarrier Spacing |
| HARQ | Hybrid Automatic Repeat Request | SDAP | Service Data Adaptation Protocol |
| IE | Information element | SDU | Service Data Unit |
| LCG | Logical Channel Group | SFN | System Frame Number |
| MAC | Medium Access Control | S-GW | Serving Gateway |
| MIB | Master Information Block | SI | System Information |
| NAS | Non-Access Stratum | SIB | System Information Block |
| NG-RAN | NG Radio Access Network | SpCell | Special Cell |
| NR | NR Radio Access | SRB | Signalling Radio Bearer |
| PBR | Prioritised Bit Rate | SRS | Sounding Reference Signal |
| PCell | Primary Cell | SS | Search Space |
| PCI | Physical Cell Identifier | SSB | SS/PBCH block |
| PDCCH | Physical Downlink Control Channel | SSS | Secondary Synchronisation Signal |

TABLE 1-continued

| Acronym | Full name | Acronym | Full name |
|---|---|---|---|
| PDCP | Packet Data Convergence Protocol | SUL | Supplementary Uplink |
| PDSCH | Physical Downlink Shared Channel | TM | Transparent Mode |
| PDU | Protocol Data Unit | UCI | Uplink Control Information |
| PHR | Power Headroom Report | UE | User Equipment |
| PLMN | Public Land Mobile Network | UM | Unacknowledged Mode |
| PRACH | Physical Random Access Channel | CRP | Cell Reselection Priority |
| PRB | Physical Resource Block | FPP | First positioning protocol |
| PSS | Primary Synchronisation Signal | SPP | Second positioning protocol |
| PUCCH | Physical Uplink Control Channel | DL-PRS | Downlink-Positioning Reference Signal |
| PUSCH | Physical Uplink Shared Channel | SL-PRS | Sidelink-Positioning Reference Signal |
| DL-AoD | Downlink Angle-of-Departure | | |
| GNSS | Global Navigation Satellite System | | |

What is claimed is:

1. A method performed by a wireless user device, the method comprising:

receiving, via a first cell, a first Radio Resource Control (RRC) Reconfiguration message, wherein the first RRC Reconfiguration message indicates at least one parameter associated with wireless communication via the first cell;

while a time alignment timer (TAT) is running, performing, via the first cell, an uplink transmission, wherein the performing the uplink transmission is based on:

channel state information (CSI)-ReportConfig;

SchedulingRequestConfig; and sounding reference signal (SRS)-Config;

initiating synchronous reconfiguration associated with access to a second cell;

after initiating the synchronous reconfiguration, stopping the TAT;

performing, for the initiated synchronous reconfiguration, a first set of procedures or a second set of procedures, wherein the wireless user device is configured to perform:

the first set of procedures based on the initiated synchronous reconfiguration being associated with a first type of synchronous reconfiguration and the second set of procedures based on the initiated synchronous reconfiguration being associated with a second type of synchronous reconfiguration; and after performing the first set of procedures or the second set of procedures, performing, via the second cell, a second uplink transmission.

* * * * *